United States Patent

Sanders et al.

[11] 4,418,684
[45] Dec. 6, 1983

[54] ROOF APERTURE SYSTEM FOR SELECTIVE COLLECTION AND CONTROL OF SOLAR ENERGY FOR BUILDING HEATING, COOLING AND DAYLIGHTING

[75] Inventors: William J. Sanders, Kansas City; Marvin K. Snyder, Overland Park, both of Kans.; James W. Harter, Independence, Mo.

[73] Assignee: Butler Manufacturing Company, Kansas City, Mo.

[21] Appl. No.: 293,998

[22] Filed: Aug. 18, 1981

[51] Int. Cl.³ .............................................. F24J 3/02
[52] U.S. Cl. .................................... 126/419; 126/430; 126/438; 126/450
[58] Field of Search ............... 126/424, 428, 429, 450, 126/419, 430, 438; 52/72, 64, 200, 171

[56] References Cited

U.S. PATENT DOCUMENTS 4,223,662  9/1980  Lunde et al. ......................... 126/424

FOREIGN PATENT DOCUMENTS 2267531  11/1975  France .............................. 126/429

OTHER PUBLICATIONS

Thermal Shutters and Shades, Shurcliff Brick House Pub. Co., Inc., ©1980.

*Primary Examiner*—Samuel Scott
*Assistant Examiner*—Noah Kamen
*Attorney, Agent, or Firm*—Shoemaker and Mattare, Ltd.

[57] ABSTRACT

The amount of building heating, cooling and daylighting is controlled by at least one pair of solar energy passing panels, with each panel of the pair of panels being exposed to a separate direction of sun incidence. A shutter-shade combination is associated with each pair of panels and the shutter is connected to the shade so that rectilinear movement of the shutter causes pivotal movement of the shade.

20 Claims, 9 Drawing Figures

ROOF APERTURE SYSTEM FOR SELECTIVE COLLECTION AND CONTROL OF SOLAR ENERGY FOR BUILDING HEATING, COOLING AND DAYLIGHTING

BACKGROUND OF THE INVENTION

The present invention relates in general to solar energy utilization, and, more particularly, to the control of such solar energy utilization.

Daylight has long been used to provide light for buildings; however, in recent years the use of solar energy as a means for heating buildings has increased.

As daylight entering the building influences the heating or cooling of that building, in many situations the amount of light provided by daylight must be balanced against the concomitant energy input to the building. One example of a situation involving this balance is the lighting of a building during summertime when heat is also being removed from that building.

There are many systems for controlling the amount of solar energy input into a building; however, none of these systems have sufficient versatility to adequately perform the just-discussed balance between light and heat input to a building.

SUMMARY OF THE INVENTION

The device embodying the teaching of the present invention controls the flow of solar heat and light energy into a building, and the flow of heat energy out through the roof of the building.

The device includes a continuous special prism-shaped roof aperture frame, with one sloped surface facing 180° from the other sloped surface. Both surfaces have solar panels formed of a transparent or translucent material (double or single glazed, glass or plastic) supported in the frame to permit the transmission of solar heat and light energy.

The device includes a shade pendently suspended from a frame to be interposed between pairs of transparent or translucent material. The shade is connected to a shutter which is mounted on the roof to be movable in a rectilinear manner. A pitman connection between the shade and the shutter permits the rectilinear shutter movement to cause pivotal movement of the shade. The shutters are ganged and interconnected to be driven by a single source if so desired.

Control means, which may be manual or automatic, are provided in order to position the shutters and shades according to the environmental needs of the building and the climatic conditions at any particular time.

A variety of thermal storage means may be provided with the roof aperture system as suitable.

By properly orienting the shutters and shades, the amount of daylight entering the building can be adjusted so that, for example, a great amount of daylight can be permitted to enter the building with a minimal amount of heat being input into the building, or the heat input can be maximized, as suitable. The shutter-shade combination thus provides great versatility to a solar energy utilization system.

OBJECTS OF THE INVENTION

It is the main object of the present invention to permit the amount of light and energy input to a building to be adjusted to maximize the efficiency with which solar energy is utilized in such a building.

It is a specific object of the present invention to provide adjustable means adjacent solar energy skylight apertures.

These together with other objects and advantages which will become subsequently apparent reside in the details of construction and operation as more fully hereinafter described and claimed, reference being had to the accompanying drawings forming part hereof, wherein like reference numerals refer to like parts throughout.

DETAILED DESCRIPTION OF THE INVENTION

Figure 1:
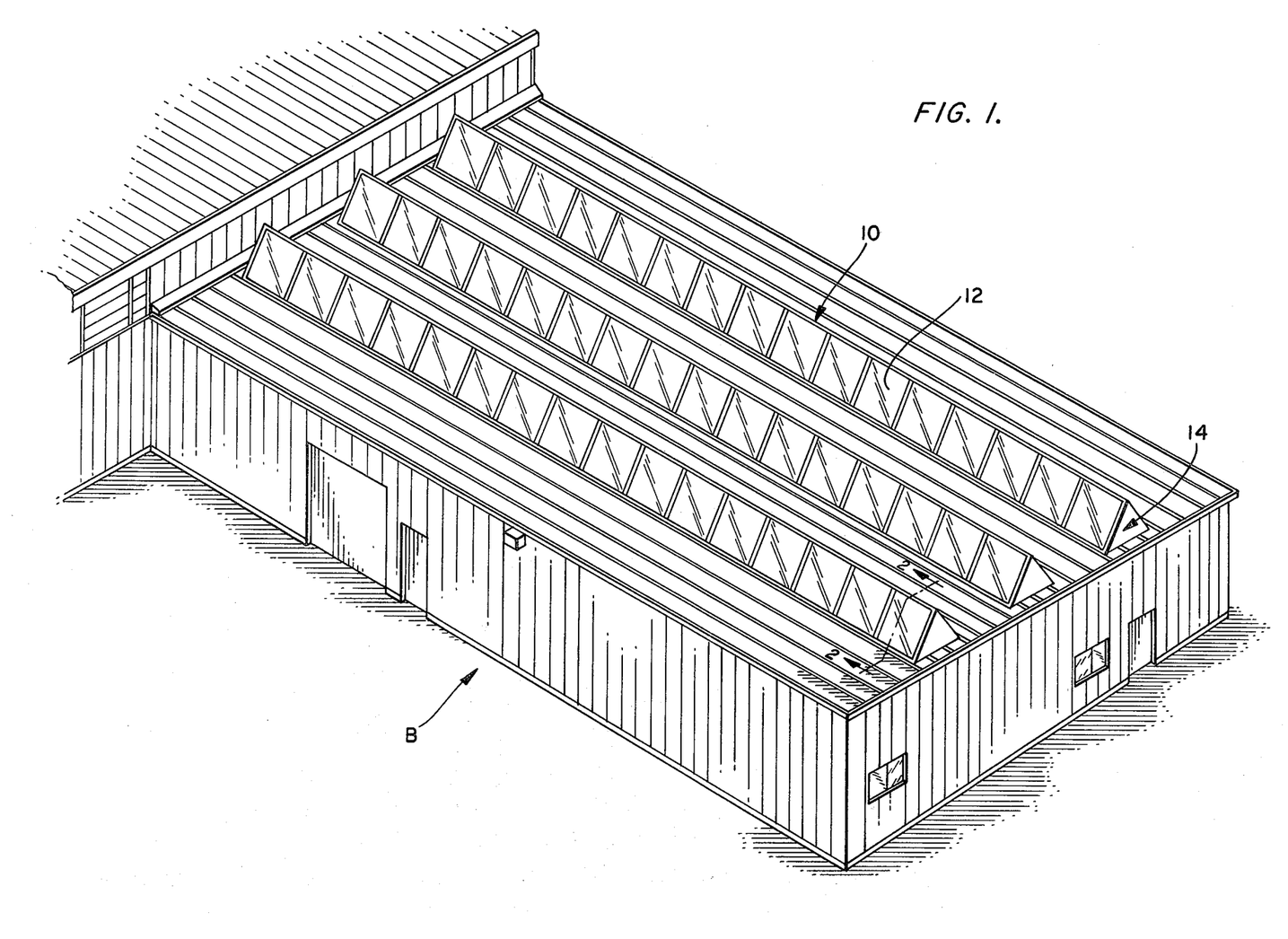
FIG. 1 is a perspective of a building using a roof aperture system embodying the teachings of the present invention.

Shown in FIG. 1 is an example of a building B using a solar heating system embodying the teachings of the present invention. The solar heating system includes a roof aperture collector system 10 which includes a multiplicity of skylight-type panels 12. Preferably, the panels are arranged in a plurality of rows which extend in an east-west direction so that panels 12 are oriented in a north-south presentation. The panels are mounted in V-shaped frames 14 to be oriented 180° from each other and to have the base of the V-shaped frame located on the roof of the building. The panels are shown in FIG. 1 to be individually mounted, but other configurations can be used if so desired. Preferably, the roof of the building is a roof manufactured by Butler Manufacturing Company and denoted by that company as MR-24 (R), and the walls of the building are also manufactured by Butler Manufacturing Company and denoted as MONOPANL (R).

Figure 3:
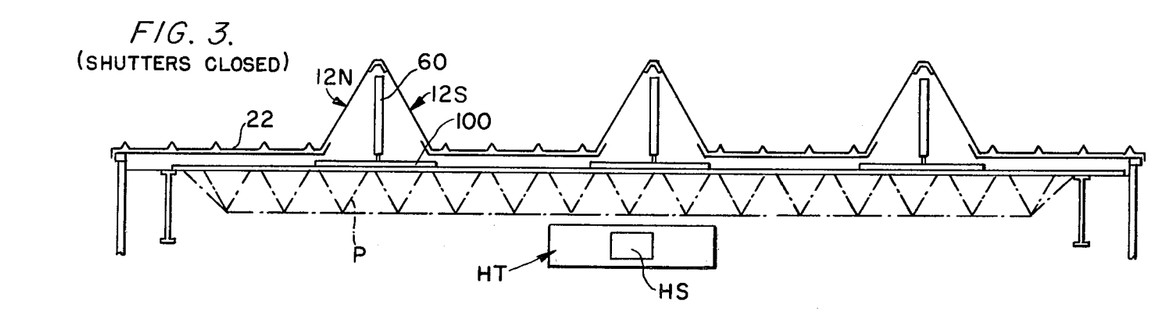
FIGS. 3–5 are schematic views showing the various end positions of the shutter-shade combinations used in the roof aperture system embodying the teachings of the present invention.
Figure 4:
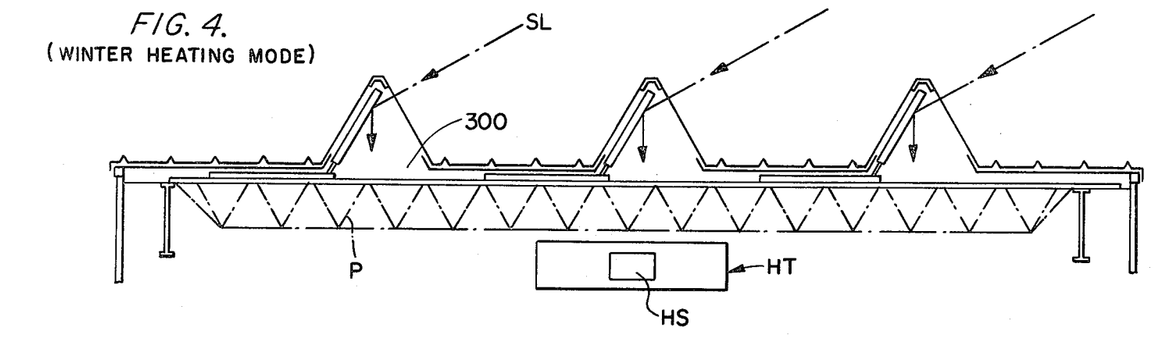
Figure 5:
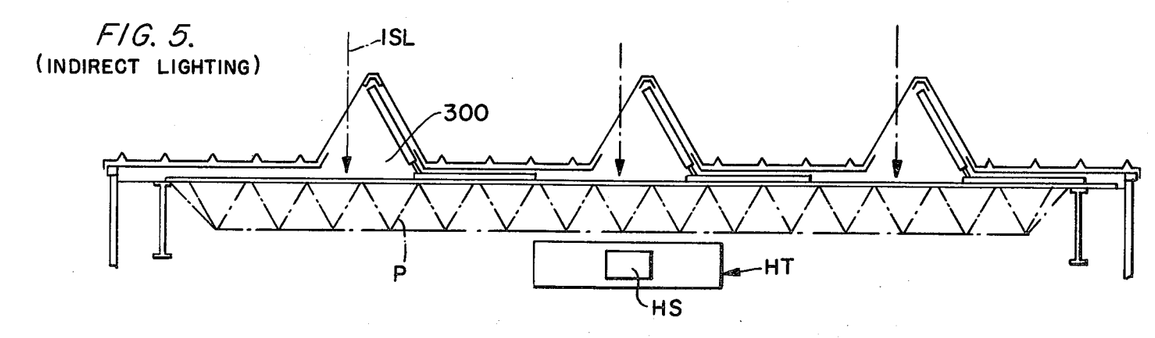

The solar energy transmitting panels are situated above a portion of the heat transfer system so that solar energy can be used in such heat transfer system. The system is indicated in FIGS. 3–5 by the block HT and includes a heat storage means HS positioned to be heated by solar energy passing through the apertures. Roof structural elements P are also shown in the figures.

Figure 2:
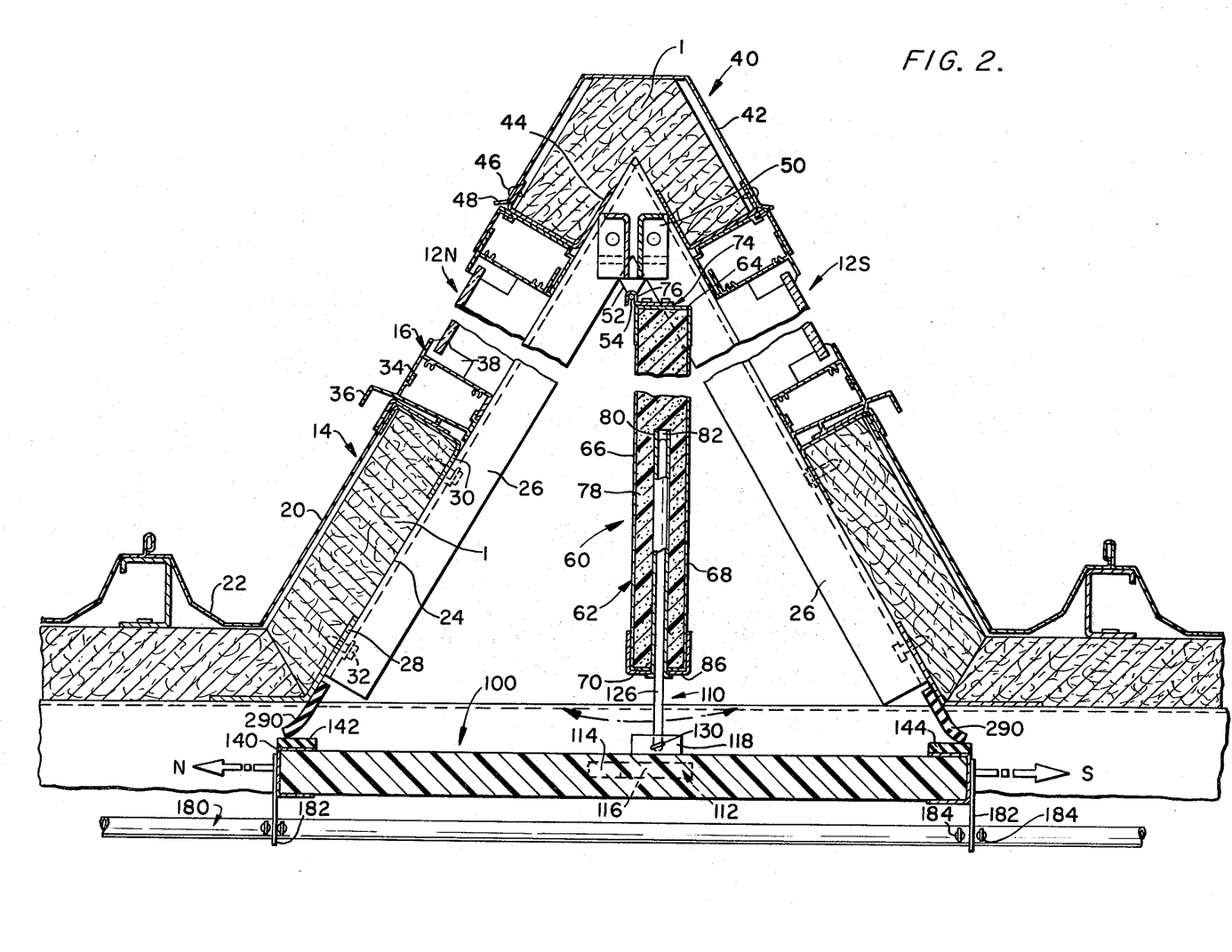
FIG. 2 is an elevation view taken along line 2—2 of FIG. 1.

Shown in FIG. 2 are panels 12N and 12S. The panels are each mounted on a sill 16, which is supported on frame 14 mounted on the roof. The frame 14 has an outer surface 20 which is a continuation of roof panel 22 and an inner surface 24 with insulation I located therebetween. Support members 26 mount angled corner plates 28 and channel members 30 via fasteners 32 or the like. Each of the sill members includes a housing 34 having a drip edge 36 integral therewith and extending outwardly of the frame. Voids are defined in the sill members, and panel mounting means such as putty 38, or the like, mounts the panels on the sills.

The frame 14 includes an apex section 40 which has an outer wall 42 and inner walls 44 with the insulation I sandwiched therebetween. Fasteners 46 attach the walls together above a drip ledge 48.

Each of a pair of hanger brackets 50 is mounted on the inner walls and fastener brackets 52 are attached to the brackets 50 to depend therefrom. A rod 54 is mounted on the fastener brackets 52 to be oriented horizontally above the roof.

A planar shade 60 extends longitudinally of the rows of frames 14 interjacent each pair of panels 12N and 12S. The shade 60 includes a housing 62 which is rectangular in cross-section and includes a top edge 64, a first face 66 and a second face 68 and a bottom ledge 70 located to be remote from the apex section 40. The shade includes a stirrup 74 mounted on the top edge 64 and which has a hook section 76 located adjacent first face 66. The hook receives the hanger rod 54 to pendently support the shade in an essentially upright orientation. Insulation 78 is positioned in the interior of the housing. Preferably, first face 66 includes reflective aluminum foil and second face 68 includes a white vinyl coating. The purpose of these two materials will be evident from the ensuing disclosure. A tube 80 is located at or near a centerline of the shade and defines a blind-ended bore 82 through the housing from bottom edge 70 past another centerline of that housing, and a cap 86 covers the bottom edge 70 with the tube 80 extending through that cap.

Figure 8:
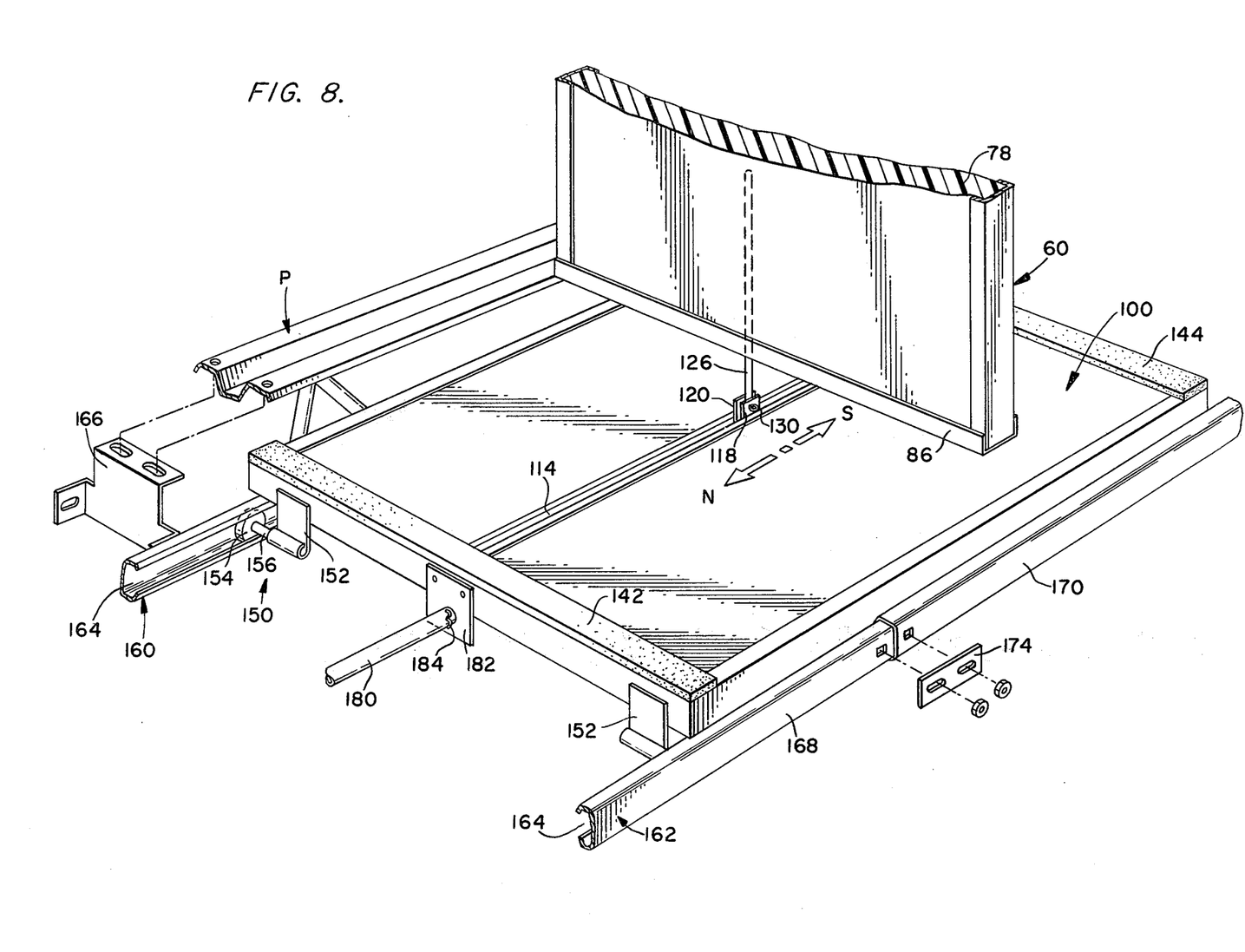
FIG. 8 is a perspective of a shutter-shade combination used in the roof aperture system embodying the teachings of the present invention.

The shades are each connected to a planar, horizontally oriented shutter 100 as shown in FIGS. 2 and 8 via a pitman-type connection 110. Each pitman connection includes a block 112 slidably positioned in a trackway 114 extending along the longitudinal centerline of the shutter associated therewith for essentially the entire length of that shutter. The block includes a body 116 positioned within the trackway and a pair of parallel ears 118 and 120 extending from the block upwardly above surface 122 of the shutter. A pitman arm 126 is connected at one end thereof to the ears by a cotter pin 130 and is telescopingly received in the bore 82 of the shade. The purpose of the connection 110 will be evident from the ensuring disclosure.

Each shutter is rectangular and bilaterally symmetric and includes a peripheral collar 140. A pair of elongate lower shutter seals 142 and 144 are mounted on the collar to extend transversely across the shutter at each end thereof. The lower shutter seals form limit stops for the sliding block 112.

Figures 7, 9:
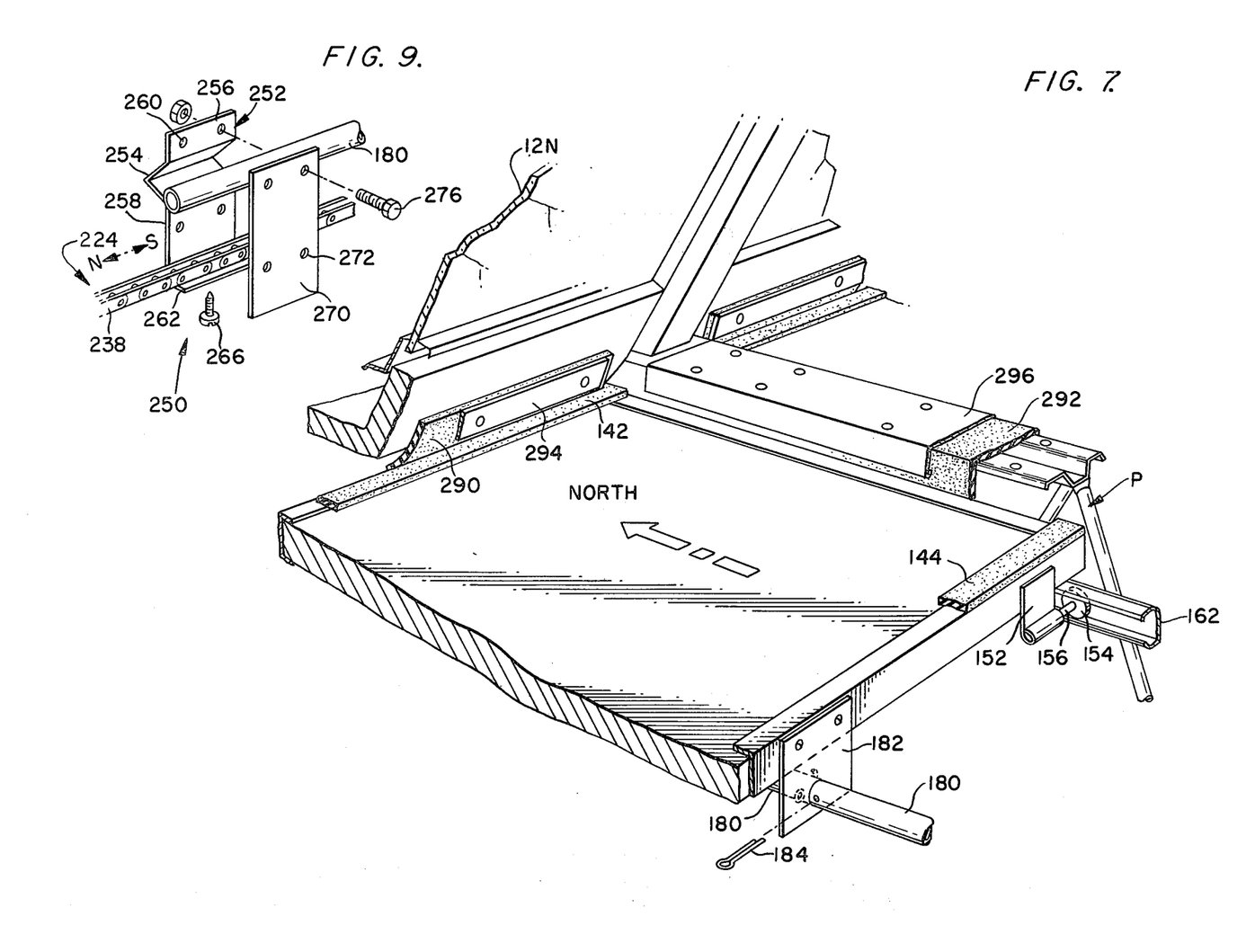
FIG. 7 is a perspective of a portion of a shutter used in the roof aperture system embodying the teachings of the present invention.
FIG. 9 is an exploded perspective of a bridle used to couple the shutters to a drive chain.

Each shutter includes a carriage assembly 150 which comprises a plurality of roller support brackets 152 each located adjacent one corner of the shutter. A wheel 154 is mounted on each bracket by an axle 156. The wheels are received in a pair of C-shaped roller tracks 160 and 162. The tracks are vertically aligned and parallel with openings 164 of each track being in facing disposition with an opening of a companion track. The tracks are mounted on the roof purlins by mounting brackets 166. The tracks are sectional with sections, such as track sections 168 and 170, telescopingly adjoined together and coupled by a fastener plate 174 using bolts or the like. The shutters move in the directions of arrows N and S in the figures.

Figure 6:
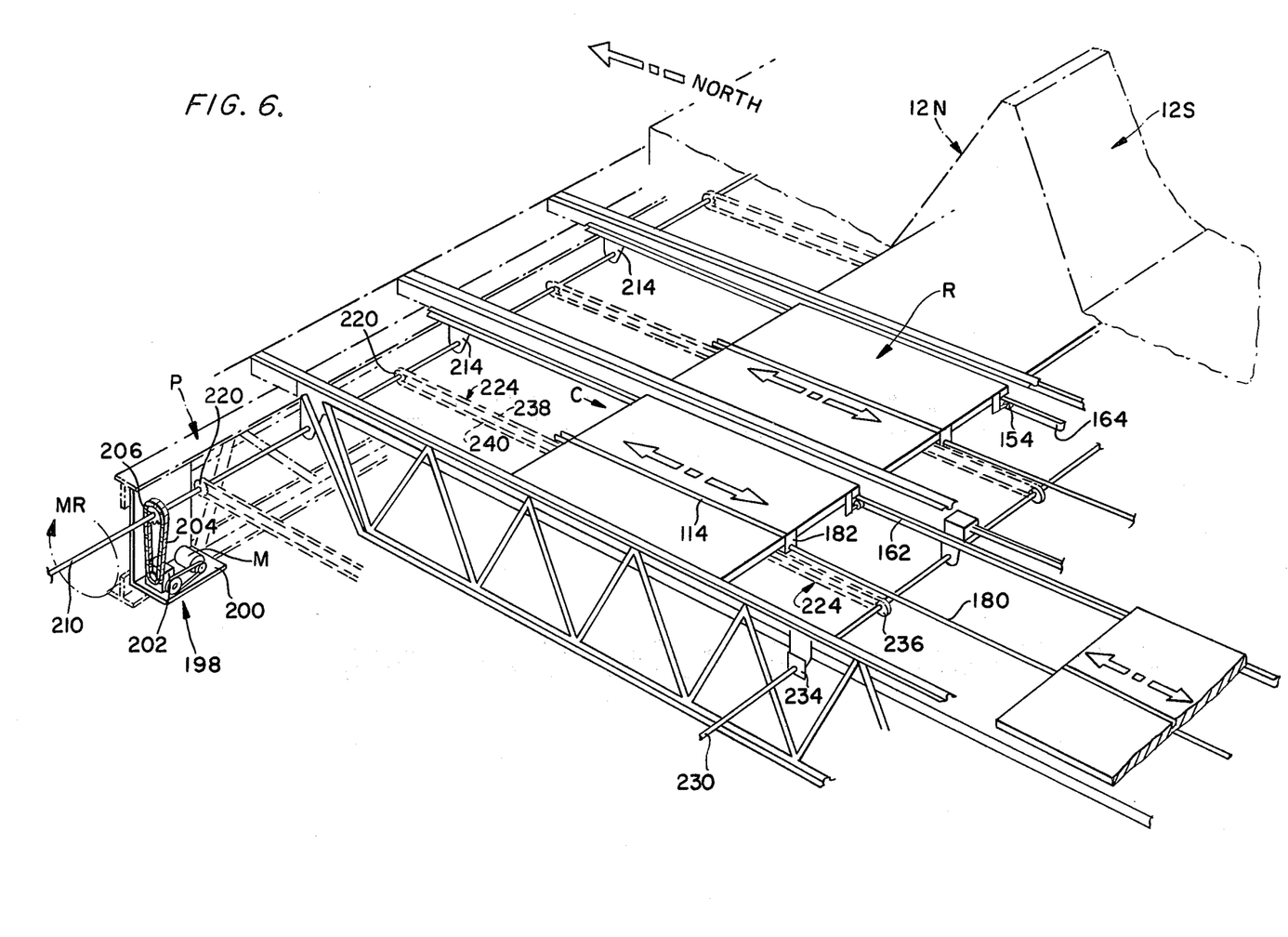
FIG. 6 is a perspective view of a shutter matrix used in the roof aperture system embodying the teachings of the present invention.

A matrix of shutters is shown in FIG. 6 to include a plurality of shutter rows R and columns C with each shutter corresponding to a pair of panels 12N and 12S. The shutters in each column are ganged together by connecting rods 180 which are mounted on the individual shutters by mounting plates 182 which depend from each end of each shutter. The rod sections are sized so that an end of each rod section telescopingly receives another end of another rod section, and cotter pins 184 connect one rod section to another so that all of the shutters in a row of shutters are rigidly interconnected to move in tandem. The cotter pins also abut the mounting plates to thereby rigidly connect the shutters to the connecting rod. Preferably, the connecting rods are aligned with the longitudinal centerline of each shutter.

As best shown in FIG. 6, a shutter moving mechanism 198 includes a motor mount 200 attached to a purlin and supporting a motor M thereon. A reducer means 202 connects the motor to a drive chain 204 which engages a sprocket 206 mounted on a drive rod 210. The drive rod 210 is supported on the purlin by brackets 214 and rotates as indicated in FIG. 6 by arrows MR.

Each of a plurality of sprockets 220 is mounted on the drive rod for rotation therewith and an endless drive chain 224 is engaged around each sprocket to be driven thereby. An idler rod 230 is mounted on the purlins by brackets 234 and includes a plurality of idler sprockets 236 mounted thereon. The drive chains 224 are trained around the sprockets to define an upper reach 238 and a lower reach 240. The rods 210 and 230 extend across the roof for the length of the rows of panels and are spaced apart a distance suitable for effecting movement of the shutters.

The shutters immediately adjacent the drive rod 210 are coupled to the drive chains by a coupling 250 shown in FIG. 9. The coupling 250 includes a first plate 252 having a V-shaped notch 254 defined therein to accommodate connecting rod 180 and fastener portions 256 and 258 through which fastener holes 260 are defined. A lower flange 262 extends parallel to the notch height and forms a ledge on which chain upper reach 238 rests. A fastener 266 couples the chain to the ledge.

A planar facing plate 270 includes fastener accommodating holes 272 defined therethrough to be aligned with holes 260 in the first plate 252. Fasteners 276 couple the two plates together to capture the connecting rod and drive chain therebetween. As the shutters are connected to the connecting rods by the mounting plates 182 and cotter pins 184, by coupling the connecting rod to the drive chain, the shutters are connected to the drive chain to be driven thereby.

Shutter seal 290 is attached to the aperture frame and shutter seal 292 is attached to a roof purlin by seal retainers 294 and 296, respectively, and serve to occlude potential heat loss paths around the shutters.

Shutter rectilinear movement is transferred to the shades by the pitman coupling 110 and translated into pivotal movement of the shades. Thus, as shown in FIGS. 2–5, the shutters move rectilinearly in the direction N or S and the sliding blocks 112 also move due to the frictional contact between the blocks and the trackways 114. The velocity of the blocks is less than that of the shades, and evenutally, the blocks engage the lower shutter seals 142 or 144. The movement of the blocks prior to such contact causes the shades to tilt so that the pitman arms 126 can move out of the bores 82 without binding or jamming. Continued movement of the shutters pulls the shades into the canted positions shown therefor in FIGS. 3-5. The process is reversed to move the shades back into the FIG. 2 upright position.

As is evident from the foregoing, the coatings on the shade surfaces 66 and 68 enhance the operation of the aperture closure system just disclosed with the winter mode (FIG. 4) presenting one face to reflect sunlight SL through opening 300 left by movement of the shutter and shade, and to cooperate with the panels 12S or 12N to permit indirect sunlight ISL (FIG. 5) to shine through the opening 300. The closed shutters prevent sunlight from entering the building, as shown in FIG. 3.

Automatic controls can be included to control operation of the motor M in accordance with seasonal needs of a building.

In selecting the positions of the shutters and shades, a balance is made between the amount of light desired and the amount of solar energy input into the building via the panels 12. As noted above, some solar energy is reflected from the panels 12 themselves, and this fact can also be taken into account in setting the position of the shutters and shades. For example, the panels 12 can be oriented at an angle of about 60° with respect to the horizontal to be high enough so that when the sun is at sun angles, most of the light incident on the panels is reflected. Such action permits transmission of sunlight through the panels, but blocks the major portion of the heating energy incident such sunlight.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. A roof aperture system for selective collection and control of solar energy for heating, cooling and daylighting a building comprising:
   a pair of solar energy and daylight transmittimg panels mounted on a frame to cover an aperture in a roof of a building, each of said panels being exposed to a separate direction of sun incidence;
   heat storage means located below said panels to have solar energy directed thereto after such solar energy has passed through said panels;
   closure means mounted adjacent said panels for controlling the amount of solar energy passing into the building aperture via said panels, said closure means including a shutter rectilinearly movably mounted on said roof adjacent said panels, a shade pivotally suspended from said frame, connecting means connecting said shutter to said shade in a manner which causes said shade to move in cooperation with said shutter, and shutter moving means connected to said shutter for moving said shutter so that the amount of solar energy passing into a building through said panels can be controlled.

2. The roof aperture system defined in claim 1 wherein said shade includes reflective surfaces adjacent the panels it is associated with.

3. The roof aperture system defined in claim 1 wherein said shutter moving means includes a motor, a drive chain and coupling means coupling said drive chain to a shutter.

4. The roof aperture system defined in claim 3 further including a plurality of shutters, and a plurality of connecting rods connecting said shutters together.

5. The roof aperture system defined in claim 1 wherein said connecting means includes a trackway defined in a shutter, a slide block movably mounted in said trackway, a pitman rod connected to said slide block, and a bore defined in the shutter and slidably receiving said pitman rod.

6. The roof aperture system defined in claim 5 further including limit stop means mounted on said shutter to contact said slide block when said shutter has moved a predetermined distance.

7. The roof aperture system defined in claim 3 further including a drive rod and an idler rod.

8. The roof aperture system defined in claim 5 further including shutter seals engaging said shutter.

9. The roof aperture system defined in claim 2 wherein said reflective surfaces include a first surface covered with foil and a second surface covered with vinyl.

10. A roof aperture system for selective collection and control of solar energy for heating, cooling and daylighting a building comprising:
    a plurality of pairs of solar energy and daylight transmitting panels mounted on frames to cover apertures in a roof of a building, respective panels of each pair being exposed to a separate direction of sun incidence;
    heat storage means located below said panels to have solar energy directed thereto after such solar energy has passed through said panels;
    closure means mounted adjacent said panels for controlling the amount of solar energy passing into the building aperture via said panels, said closure means including a plurality of shutters rectilinearly movably mounted on said roof adjacent said pair of panels, a plurality of shades pivotally suspended from said frames, connecting means connecting said shutters to said shades in a manner which causes said shades to move in cooperation with said shutters, and shutter moving means connected to said shutters for moving said shutters so that the amount of solar energy passing into a building through said panels can be controlled.

11. The roof aperture system defined in claim 10 further including a plurality of connecting rods connecting said plurality of shutters together.

12. The roof aperture system defined in claim 10 wherein said shutter moving means includes a motor, a drive chain and coupling means coupling said drive chain to at least one shutter.

13. The roof aperture system defined in claim 12 further including a drive rod and an idler rod.

14. The roof aperture system defined in claim 10 wherein said connecting means includes a trackway defined in each shutter, a slide block movably mounted in each said trackway, a pitman rod connected to each slide block, and a bore defined in each shutter and slidably receiving the respective pitman rod therein.

15. The roof aperture system defined in claim 14 further including limit stop means mounted on each shutter to contact said respective slide block when said shutter has moved a predetermined distance.

16. The roof aperture system defined in claim 10 further including shutter seals engaging said shutter.

17. The roof aperture system defined in claim 10 wherein each of said shades includes reflective surfaces adjacent the panels it is associated with.

18. The roof aperture system defined in claim 17 wherein said reflective surfaces include a first surface covered with foil and a second surface covered with vinyl.

19. A roof aperture system for selective collection and control of solar energy for heating, cooling and daylighting a building comprising:
- a pair of solar energy and daylight transmitting panels mounted on a frame to cover an aperture in a roof of a building, each of said panels being exposed to a separate direction of sun incidence;
- heat transfer means located below said panels to have solar energy directed thereto after such solar energy has passed through said panels;
- heat storage means associated with said heat transfer means;
- closure means mounted adjacent said panels for controlling the amount of solar energy passing into the building aperture via said panels, said closure means including a shutter rectilinearly movably mounted on said roof adjacent said panels, a shade pivotally suspended from said frame, connecting means connecting said shutter to said shade in a manner which causes said shade to move in cooperation with said shutter, and shutter moving means connected to said shutter for moving said shutter so that the amount of solar energy passing into a building through said panels can be controlled; and
- said shutter moving means including a motor, a drive chain and coupling means coupling said drive chain to a shutter.

20. The roof aperture system defined in claim 19 further including a plurality of pairs of panels, a plurality of shutters, and a plurality of connecting rods connecting said shutters together for simultaneous operation.

* * * * *